United States Patent

Pickles et al.

[11] Patent Number: 6,038,489
[45] Date of Patent: Mar. 14, 2000

[54] MACHINE TOOLS

[75] Inventors: John David Pickles, Skipton; Selwyn Jonathan Griffiths, Northampton, both of United Kingdom

[73] Assignee: Unova U.K. Limited, Aylesbury, United Kingdom

[21] Appl. No.: 08/952,923

[22] PCT Filed: Jul. 10, 1996

[86] PCT No.: PCT/GB96/01646

§ 371 Date: Nov. 24, 1997

§ 102(e) Date: Nov. 24, 1997

[87] PCT Pub. No.: WO97/03391

PCT Pub. Date: Jan. 30, 1997

[30] Foreign Application Priority Data

Jul. 10, 1995 [GB] United Kingdom .................... 9514042
May 15, 1996 [GB] United Kingdom .................... 9610142

[51] Int. Cl.⁷ .............................. G06F 19/00; G06G 7/78
[52] U.S. Cl. .......................... 700/164; 700/188; 700/187; 700/160; 700/193; 700/161; 700/165; 700/195; 82/106; 82/118; 82/133; 29/888.08
[58] Field of Search .......................... 364/474.3, 474.29, 364/474.06, 474.35, 474.03, 474.05, 474.37; 82/106, 118, 133; 29/888.08; 700/188, 187, 164, 193

[56] References Cited

U.S. PATENT DOCUMENTS

| | | | |
|---|---|---|---|
| 3,894,452 | 7/1975 | Kazik et al. ................................ | 82/134 |
| 4,165,661 | 8/1979 | Wasco, Jr. et al. ........................ | 82/117 |
| 4,206,393 | 6/1980 | Chiba ....................................... | 318/632 |
| 4,270,421 | 6/1981 | Robinson et al. ......................... | 82/133 |
| 4,343,206 | 8/1982 | Douglass et al. .......................... | 82/117 |
| 4,384,333 | 5/1983 | Maacker ............................... | 264/474.06 |
| 4,386,407 | 5/1983 | Hungerford .............................. | 364/474 |
| 4,517,717 | 5/1985 | Gentry ..................................... | 29/6.01 |
| 4,558,978 | 12/1985 | Berbalk .................................... | 409/200 |
| 4,656,723 | 4/1987 | Uchida ..................................... | 148/226 |
| 4,829,642 | 5/1989 | Thomas et al. ......................... | 29/527.6 |
| 4,990,840 | 2/1991 | Migda ..................................... | 318/571 |
| 5,038,450 | 8/1991 | Swars ..................................... | 29/421.1 |
| 5,131,143 | 7/1992 | Kirchberger .......................... | 29/888.08 |
| 5,195,407 | 3/1993 | Takeno et al. ............................ | 82/1.11 |
| 5,387,061 | 2/1995 | Barkman et al. ......................... | 409/80 |
| 5,391,024 | 2/1995 | Levine et al. ............................. | 409/84 |
| 5,435,059 | 7/1995 | Chawla ................................. | 29/888.08 |
| 5,436,845 | 7/1995 | Takahashi ......................... | 364/474.21 |
| 5,467,675 | 11/1995 | Dow et al. ................................. | 82/1.11 |

FOREIGN PATENT DOCUMENTS

| | | |
|---|---|---|
| 0 261 510 | 3/1988 | European Pat. Off. . |
| 0 265 607 | 5/1988 | European Pat. Off. . |
| 0 396 028 | 11/1990 | European Pat. Off. . |
| 2 079 003 | 1/1982 | United Kingdom . |

*Primary Examiner*—William Grant
*Assistant Examiner*—Iván Calcano
*Attorney, Agent, or Firm*—Lee, Mann, Smith, McWilliams, Sweeney & Ohlson

[57] ABSTRACT

In a machine tool, a component such as a grinding wheel acts on a workpiece to form the latter into a circularly asymmetric shape, for example, a crankpin. Movement of the grinding wheel is controlled by a control signal which is derived from theoretical relative positions and positional velocities of the grinding wheel relative to the workpiece. In the course of at least one revolution of the workpiece, the respective positions of the grinding wheel relative to the workpiece are measured for each of a succession of angular positions of the workpiece. The measured positions are compared with corresponding theoretical positions and data indicative of any differences are stored, and then used to modify the control signal during a subsequent revolution of the workpiece so as to compensate for any of said differences and thereby reduce the magnitude of any error which would have resulted from the measured positional differences.

8 Claims, 3 Drawing Sheets

MACHINE TOOLS

FIELD OF THE INVENTION

This invention relates to a method of controlling a machine tool so as to remove material from a rotating work-piece to form the latter into a desired shape which, is circularly asymmetric about the axis off rotation of the work-piece. The invention is particularly applicable to machines for the grinding of components such as, for example, crankpins and camshafts. The invention is also applicable to other machines, for example milling machines, brooch turning machines and turning machines (such as lathes).

BACKGROUND TO THE INVENTION

A work-piece rotating about an axis can be ground into parts which are circularly asymmetric with the axis of rotation by means of a grinding wheel which is moved laterally to that axis. In order to grind the parts rapidly, and to a high degree of geometric accuracy, a high performance servo system is used to control the movement of the grinding wheel towards and away from the work-piece as the latter rotates.

The servo system includes sensors for measuring the position of the wheel and the velocity with which it moves towards or away from the work-piece, and these are connected in respective position and velocity feedback loops which facilitate the accurate control of those parameters by a control computer. Typically, the position feedback loop has a bandwidth of 10 Hz and the bandwidth of the velocity feedback loop is 200 Hz.

The controlling computer can calculate very accurately the exact grinding wheel position required for any angular portion of the work-piece, (the work-piece angle) so as to generate the required offset diameter. The same computer can measure the instantaneous position of the grinding wheel (through the position feedback loop) at any work-piece angle by using a high speed, high accuracy measuring system such as a linear scale to a typical position resolution of 0.0001 mm.

The computer, knowing the required position and the actual position of the grinding wheel can calculate a position error and feed an error signal derived therefrom to the servo system controlling the movement of the grinding wheel, in order to correct its position and thereby minimise the position error for all work-piece angular positions.

In order to achieve the required geometric tolerances in the finished component, grinding wheel position errors of typically less than 0.001 mm are required.

However, it is difficult to maintain the required error envelope to achieve such accuracy, especially if the work-piece is to rotate at speeds of more than 20 rpm, as a result of the limited bandwidth of the position control loop. Furthermore, there is no correction of time varying contributions to the error (for example electronic or servo drift) which can become significant over a protracted period of time.

It is an object of the present invention to provide an improved control system and method for controlling a machine tool so as to achieve the desired error envelope with higher speeds of rotation of the work-piece.

SUMMARY OF THE INVENTION

According to the invention, there is provided a method of controlling a machine tool so that a component on the machine tool removes material from a rotating work-piece so as to form the latter into a desired shape which is circularly asymmetric, the method comprising the steps of:

generating a control signal which is derived from data of theoretical positions and positional velocities of the component relative to the workpiece, and which causes the component to move relative to the work-piece in directions lateral to the axis of rotation of the latter;

in the course of at least one revolution of the work-piece, measuring the respective position of the component relative to the work-piece when the work-piece is in each of a succession of angular positions;

comparing measured positions with the corresponding theoretical positions and storing data indicative of any differences between the measured and theoretical positions; and modifying the control signal during a subsequent revolution of the work-piece so as to compensate for said differences and thereby reduce the magnitude of any error which would have resulted from the measured positional differences.

The component and the work-piece are conveniently mounted on a frame of the machine. The component may be fixed relative to the frame, in which case said lateral movement is achieved by moving the workpiece laterally relative to the frame. Preferably, however, the axis of rotation of the work-piece is fixed relative to the frame and said lateral relative movement is achieved by moving the component relative to the frame.

Preferably, the machine tool is a grinder, the component comprising a grinding wheel.

A computer can measure very accurately the positional error of the grinding wheel at any work-piece angle. It has been found that this positional error is systematic for any given work-piece speed and grinding wheel position trajectory during any given period of time and errors detected during one revolution do not have to be corrected "instantaneously" during that revolution, but can be compensated for during a subsequent revolution. Consequently, the control signal can be modified taking into account not only the required positions of the grinding wheel which compensate for previously measured errors, but also the required speed of advance or retraction of the grinding wheel (its positional velocity). This is significant because the velocity control feedback loop, with a bandwidth of typically 200 Hz, has a greater capacity to control the grinding wheel position at higher work speeds than the position feedback loop alone, in that the greater bandwidth permits a faster response to required change than in the case of the position feedback loop.

Preferably, the measurements of the positions of the component are made over each of a plurality of, preferably successive, revolutions of the work-piece, and the data obtained during each of the said revolutions is used to modify the control signal for the next revolution.

Where there is no need to maintain a record of the error correction, the data obtained during a given revolution of the work-piece may supersede error data obtained during a previous revolution, and the earlier data may be discarded.

Preferably, each measured position is the average of a plurality, of measured positions of the wheel for neighbouring angular positions of the work-piece in the same revolution thereof. Typically each is an average of ten measurements, which are taken at angular intervals in the region of 0.1 degrees (the angular intervals may vary depending on the required speed of rotation of the work-piece).

In the method, the measurements of positions of the grinding wheel occur while the grinding wheel is grinding the work-piece into shape. However, in a refinement to the method, measurements of the component positions relative to the work-piece rotation, are taken while there is little or substantially no force acting between the component and the work-piece. The associated error data is then used to modify the control signal for a plurality of subsequent revolutions, during which the component is working.

This may be achieved by reducing work-piece/grinding wheel contact force during one or more selected revolutions of the work-piece so that there is minimal or zero movement of the grinding wheel towards the work-piece during that revolution, i.e. the 'feed' of the grinding wheel, is minimal or zero thereby minimising (or eliminating any errors arising from the feed measuring system associated with the grinding wheel.

Preferably, the selected revolution occurs after a plurality of previous revolutions, for each of which the control signal was modified, and shortly before the expected end of the process.

BRIEF DESCRIPTION OF THE DRAWINGS

A method in accordance with the invention will now be described, by way of example, with reference to the accompanying drawings in which.

DETAILED DESCRIPTION

Figure 1:
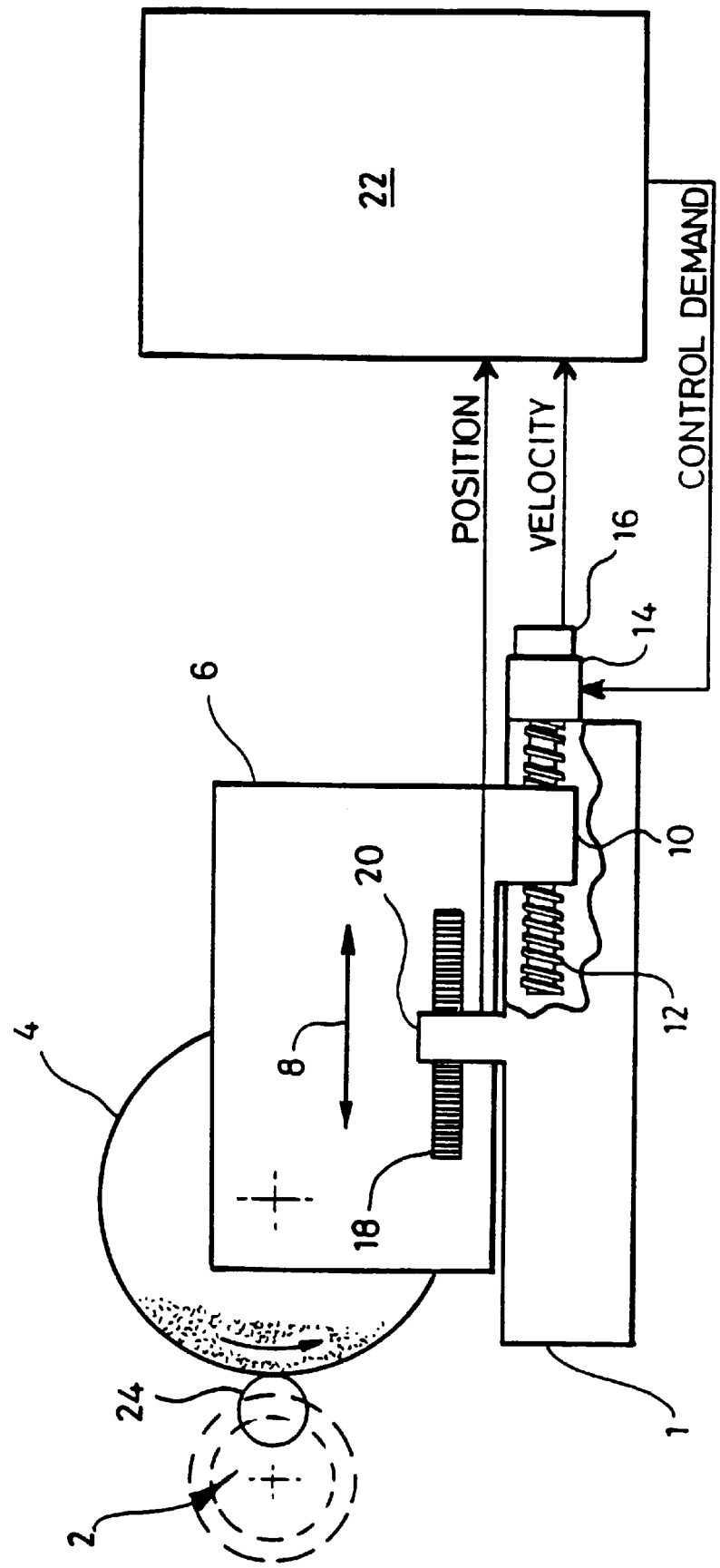
FIG. 1 is a simplified diagrammatic side view of part of a grinding machine for performing the method.

The method can be performed by apparatus comprising a cylindrical grinding machine which has a frame 1 having a rotatable assembly (not shown) for supporting a work-piece 2, and means for rotating the work-piece 2 in a controlled manner. The work-piece 2 is acted on by a grinding wheel 4, carried by a wheel-head assembly 6. The latter, and thus the grinding wheel 4, is movable laterally relative to the axis of rotation of the work-piece in the directions of the arrows 8. The wheel-head 6 is moved laterally by a worm drive comprising a threaded passage in a lug 10 on the wheel-head 6, and a threaded shaft 12 which is rotatably mounted on the frame 1 and which extends through the passage in the lug 10. The shaft is driven by a servo motor 14 which is fitted with a tachometer 16 for measuring the speed of rotation of the shaft 12. The velocity of the wheel-head 6, and hence the positional velocity of the wheel 4, can be derived from that measurement.

The wheel-head 6 carries a linear scale 18 which is read by a sensor 20 to determine the position of the wheel-head 6, and hence the wheel 4.

The sensors 16 and 20 form part of a servo system which includes a computer 22, for controlling the velocity and the position of the wheel head assembly 6, and hence the grinding wheel 4, and which also includes velocity and position feedback loops.

Data on the theoretical positions of the wheel during the grinding operation are stored in a memory in the computer 22. The latter is programmed to generate a control signal for the motor 14 and thereby controls the position (and positional velocity) of the wheel 4. The computer 22 is also arranged to compare the measured positions of the wheel 4 at various angular positions of the work-piece 2. This enables the computer to build up a table, for a given revolution of the work-piece 2, of wheel position error against work-piece angle. The computer is also arranged to use that table subsequently to modify the control signals so as to compensate for any errors.

In this example, the workpiece 2 is in the form of a crankshaft having a number of crankpins, one of which is referenced 24, which are to be individually ground by the wheel 4. Thus, once the first crankpin has been ground by the wheel 4, the workpiece is moved axially, in a direction perpendicular to the plane of FIG. 1, until the next crankpin region of the workpiece to be ground is in registry with the wheel 4, to permit grinding to begin. The grinding and repositioning steps are repeated until all the crankpins have been ground.

Figure 2:
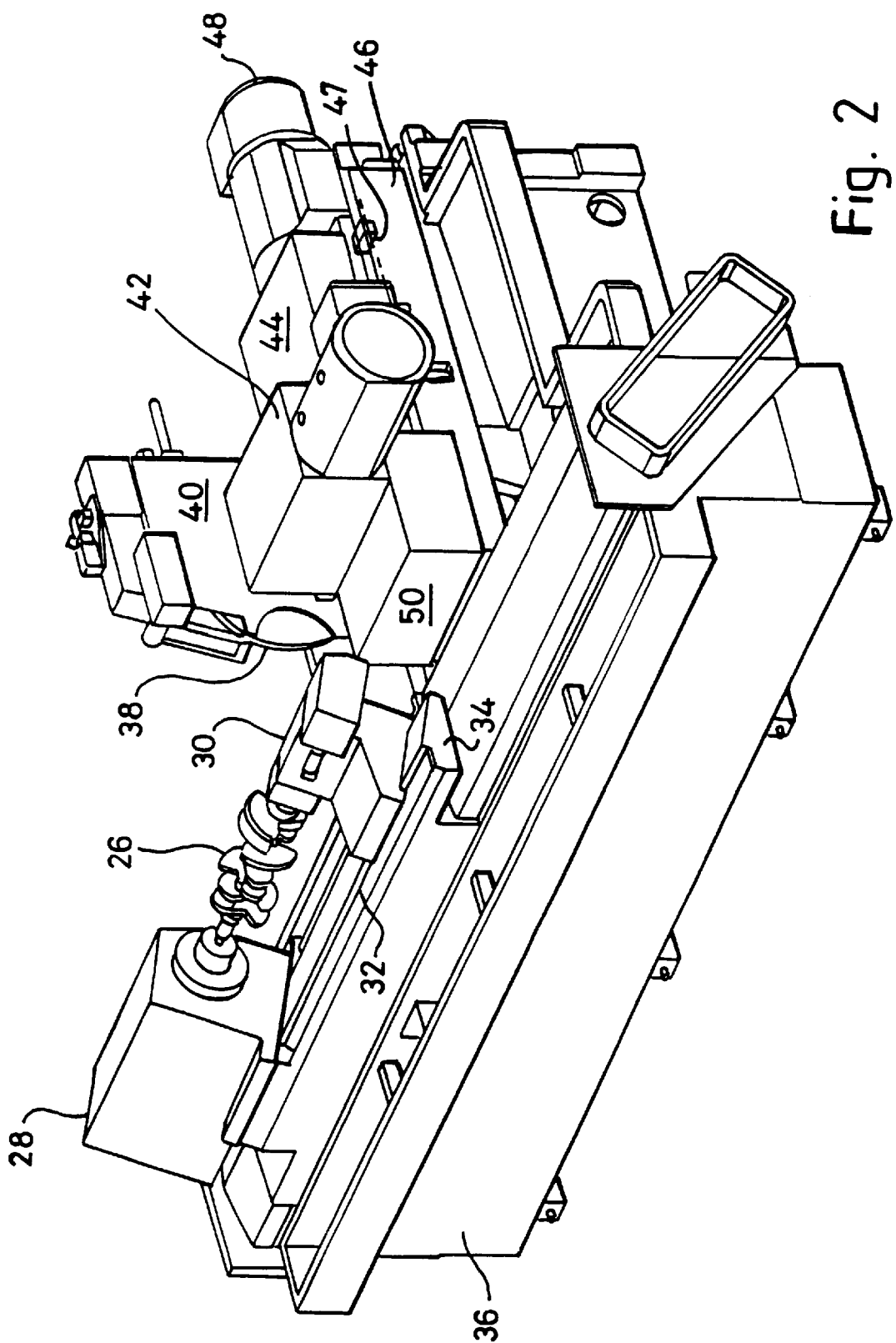
FIG. 2 is a more detailed perspective view of a grinding machine with which the method can be performed.

The machine shown in FIG. 2 is operable to grind a crankshaft 26 which is mounted at one end in a headstock 28. This contains a drive (not shown) for rotating the crankshaft 26 about its major axis. The opposite end of the crankshaft 26 is rotatably mounted in a tailstock 30 which is slidably mounted on a slideway 32. The latter is located on a carriage 34 which also carries the headstock 28. Thus, the tailstock 30 can move towards or away from the headstock 28 to accommodate crankshafts of differing lengths, but the assembly of headstock and tailstock can be indexed as one for relocating the workpiece.

Figure 3:
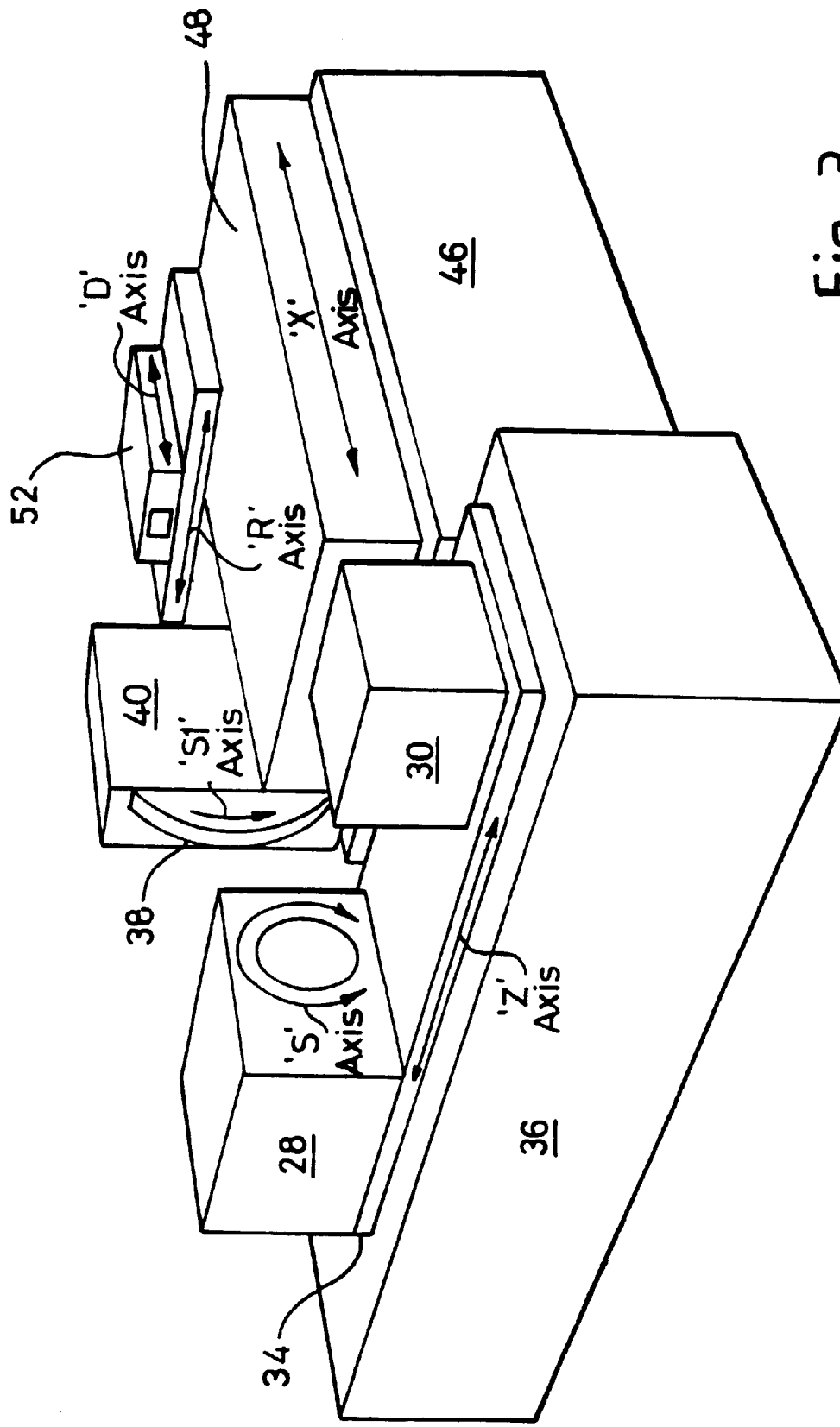
FIG. 3 is a schematic perspective representation of the machine shown in FIG. 2, showing the axes along which various parts of the machine move.

To this end the carriage 34 is slidable along a bed 36 and is connected to an indexing drive (not shown) for moving the carriage 34 along the bed 36, to bring each of the crankpins in turn into registry with a grinding wheel 38. This movement is indicated by the Z axis of FIG. 3.

The wheel 38 is partially shrouded by a guard assembly 40, and is rotatably mounted on a drive 42 which is in turn fixed to a table 44 slidably carried on a bed 46. A further motor 48 operates a drive such as a worm drive (not shown), similar to the drive shown in the machine in FIG. 1, for sliding the table 44, and hence the drive 42, the assembly 40 and the wheel 38 along the bed 46. The motor 48 therefore causes the wheel 38 to move horizontally towards and away from the crankshaft 26 in the direction of the "X" axis indicated in FIG. 3. This movement causes the drive 42 to slide over a support block 50 which is attached to the bed 46.

A sensor 47 similar to the sensor 20 is also attached to the bed 46 and arranged to read a linear scale (not shown), similar to the scale 18, on the table 44.

Similarly, the motor 48 is fitted with a tachometer which serves the same purpose as the tachometer 16.

The machine also includes sensors for detecting the position of the headstock 28 and tailstock 30 on the bed 36, and the speeds of rotation of the crankshaft 26 and wheel 40.

The outputs of these sensors are fed to a computer (not shown) which controls the position and speed of rotation of the crankshaft 26 and the wheel 38 so that each crankpin is ground in turn in accordance with the method described in relation to the machine shown in FIG. 1.

After numerous grinding operations, the grinding surface of the wheel 38 may become irregular or worn. The grinding machine is therefore fitted with a wheel dresser 52 for removing any such irregularities, to ensure that the grinding surface of the wheel is cylindrical and concentric with the wheel axis of rotation. For the sake of clarity, the dresser 52 has been omitted from FIG. 2.

With both the machines previously described, the compensation procedure can be integrated almost transparently into the production process as follows:

On a given signal, for example on the start of each day, or on selection of a new component, or by operator demand, a "Correction" cycle is initiated.

A regular grind cycle is started.

The grinding wheel 4 moves to the work-piece 2. The work-piece 2 starts rotating at the angular velocity normally used to grind the part whilst simultaneously the grinding wheel 4 starts to move in the trajectory computed from the theoretical position/velocity information stored in the memory to grind the required shape. If initiated during a grinding process any earlier corrections are ignored.

On each subsequent revolution of the work-piece 2, a table of grinding wheel position errors with respect to work-piece angle is built up, the most recent data overwriting the corresponding data from the previous revolution, so that the table always contains the most recent revolution position error data.

The table is used during each revolution of the work-piece 2 to "Correct" the signals developed by the computer 22 to determine the grinding wheel position AND VELOCITY. The significant thing is that by influencing the velocity controlling signal as well as the position signal, a better response is achieved since the velocity control system, has a bandwidth of typically 200 Hz and therefore has a greater capacity to control the grinding wheel position at high work speeds than does the position feedback loop.

At a selected point in the grinding cycle, typically close to final size, but not necessarily so, a revolution of the work-piece 2 is made with the grinding wheel 4 under little or no cutting load. The position errors during this revolution are mathematically smoothed and stored and used as the correction table during subsequent revolutions of the work-piece.

On machines equipped with a sizing gauge this will be an opportune time to stop the work-piece rotation, apply the gauge and calculate any size error.

After the gauge has been retracted, the grinding wheel 4 is again moved to the work-piece 2, the work-piece 2 is re-started and rotated at the angular velocity required for grinding whilst simultaneously the wheel-head advance is restored to move the grinding wheel along the "Corrected" trajectory, thereby to eliminate the measured errors.

As an option to the above cycle, position error tables from several successive grinds can be averaged and the resultant table smoothed to average out any possible errors emanating from the work-piece drive servo (not shown), that might arise due to grinding the same shape at different angles.

The above procedures can equally well be applied to the grinding of non-round parts such as cam-lobes, on a cylindrical grinder.

We claim:

1. A method of controlling a grinding machine so that a grinding wheel thereof removes material from a rotating workpiece so as to form the latter into a desired shape which is circularly asymmetric, the method comprising the steps of:
   (a) generating a control signal which is derived from data of both theoretical positions and theoretical positional velocities of the grinding wheel relative to the workpiece, and which causes the grinding wheel to move relative to the workpiece in directions lateral to the axis of rotation of the latter;
   (b) moving the grinding wheel along a path relative to the workpiece in accordance with said control signal, so as to follow the desired contour of the workpiece;
   (c) in the course of a plurality of revolutions of the workpiece, measuring the respective positions of the grinding wheel relative to the workpiece when the workpiece is in each of a succession of angular positions;
   (d) comparing said measured positions with corresponding theoretical positions and storing data indicative of any differences between the measured and theoretical positions; and
   (e) modifying the control signal during a subsequent revolution of the workpiece so as to compensate for said differences and thereby reduce the magnitude of any error which would have resulted from said measured positions.

2. A method according to claim 1 in which the grinding wheel and the workpiece are mounted on a frame of the machine, the axis of rotation of the workpiece being fixed relative to the frame and said relative lateral movement of the grinding wheel being achieved by moving the grinding wheel relative to the frame.

3. A method according to claim 1, in which the measurements of the positions of the grinding wheel are made over each of a plurality of successive revolutions of the workpiece, and the data obtained during each of said revolutions is used to modify the control signal for the next revolution.

4. A method according to claim 3 in which the data obtained during a given revolution of the workpiece supersedes data obtained during a previous revolution, and the earlier data is discarded.

5. A method according to claim 1 in which each measured position of the grinding wheel is the average of a plurality of measured positions for neighboring angular positions of the workpiece in the same revolution thereof.

6. A method of controlling a grinding machine so that a grinding wheel thereof removes material from a rotating workpiece so as to form the latter into a desired shape which is circularly asymmetric, the method comprising the steps of:
   (a) generating a control signal which is derived from data of both theoretical positions and theoretical positional velocities of the grinding wheel relative to the workpiece, and which causes the grinding wheel to move relative to the workpiece in directions lateral to the axis of rotation of the latter;
   (b) moving the grinding wheel along a path relative to the workpiece in accordance with said control signal, as so to follow the desired contour of the workpiece;
   (c) in the course of at least one revolution of the workpiece, measuring the respective positions of the grinding wheel relative to the workpiece when the workpiece is in each of a succession of angular positions;
   (d) comparing said measured positions with corresponding theoretical positions and storing data indicative of any differences between the measured and theoretical positions;
   (e) modifying the control signal during a subsequent revolution of the workpiece so as to compensate for said differences and thereby reduce the magnitude of any error which would have resulted from said measured positions; and
   (f) wherein, during one revolution of the workpiece, measurements of the grinding wheel positions relative to the workpiece are taken while there is little or substantially no force acting between the grinding wheel and the workpiece, and the associated data is then used to modify the control signal for a plurality of subsequent revolutions during which the grinding wheel is working.

7. A method according to claim 6 in which said revolution occurs after a plurality of previous revolutions, for each of which the control signal was modified, and shortly before the expected end of the machining process.

8. A grinding machine for grinding a rotating workpiece into a shape which is circularly asymmetric with the axis of rotation of the workpiece, the machine comprising a grinding wheel for removing material from the workpiece, drive means for moving the wheel along a path laterally relative to the axis of rotation of the workpiece so as to follow the desired contour of the workpiece, sensor means for sensing the position and positional velocities of the wheel relative to the workpiece, and control means connected to the drive means and the sensor means and arranged to generate a control signal derived from data of both theoretical positions and theoretical positional velocities of the wheel for each revolution of the workpiece to cause said relative movement of the wheel to measure, in the course of one revolution of the workpiece, the respective relative positions of the wheel when the workpiece is in each of a succession of angular positions, to compare said measured positions with the corresponding theoretical positions, to store data indicative of any differences between measured and theoretical positions, and to modify the control signal during a subsequent revolution of the workpiece so as to compensate for said differences and thereby reduce the magnitude of any error which would have resulted from said measured positional differences.

* * * * *